Sept. 22, 1942.  H. S. JANDUS  2,296,675
HAND BRAKE LEVER
Filed March 7, 1940.  2 Sheets-Sheet 1
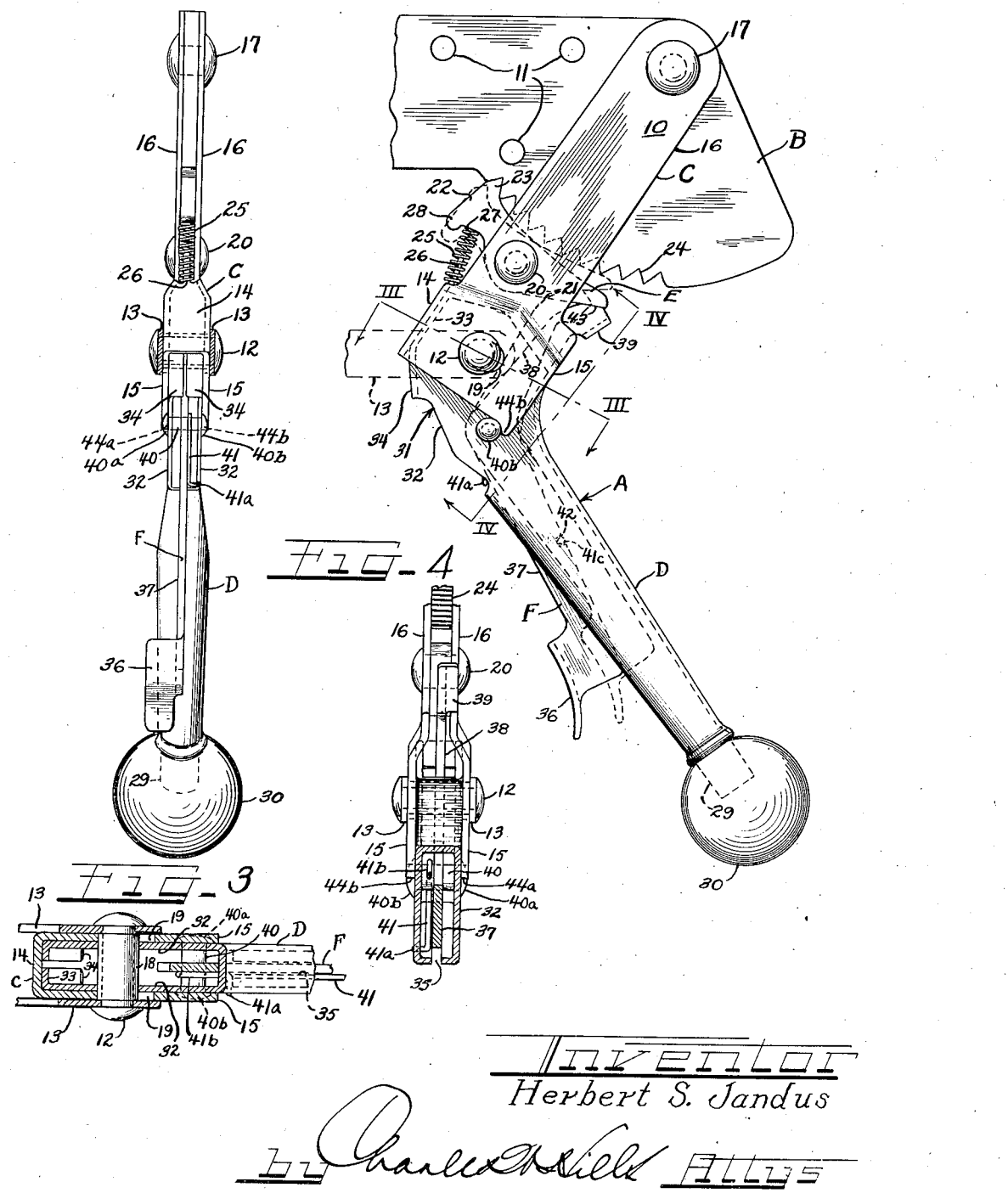
Inventor
Herbert S. Jandus Sept. 22, 1942.    H. S. JANDUS    2,296,675
HAND BRAKE LEVER
Filed March 7, 1940    2 Sheets-Sheet 2
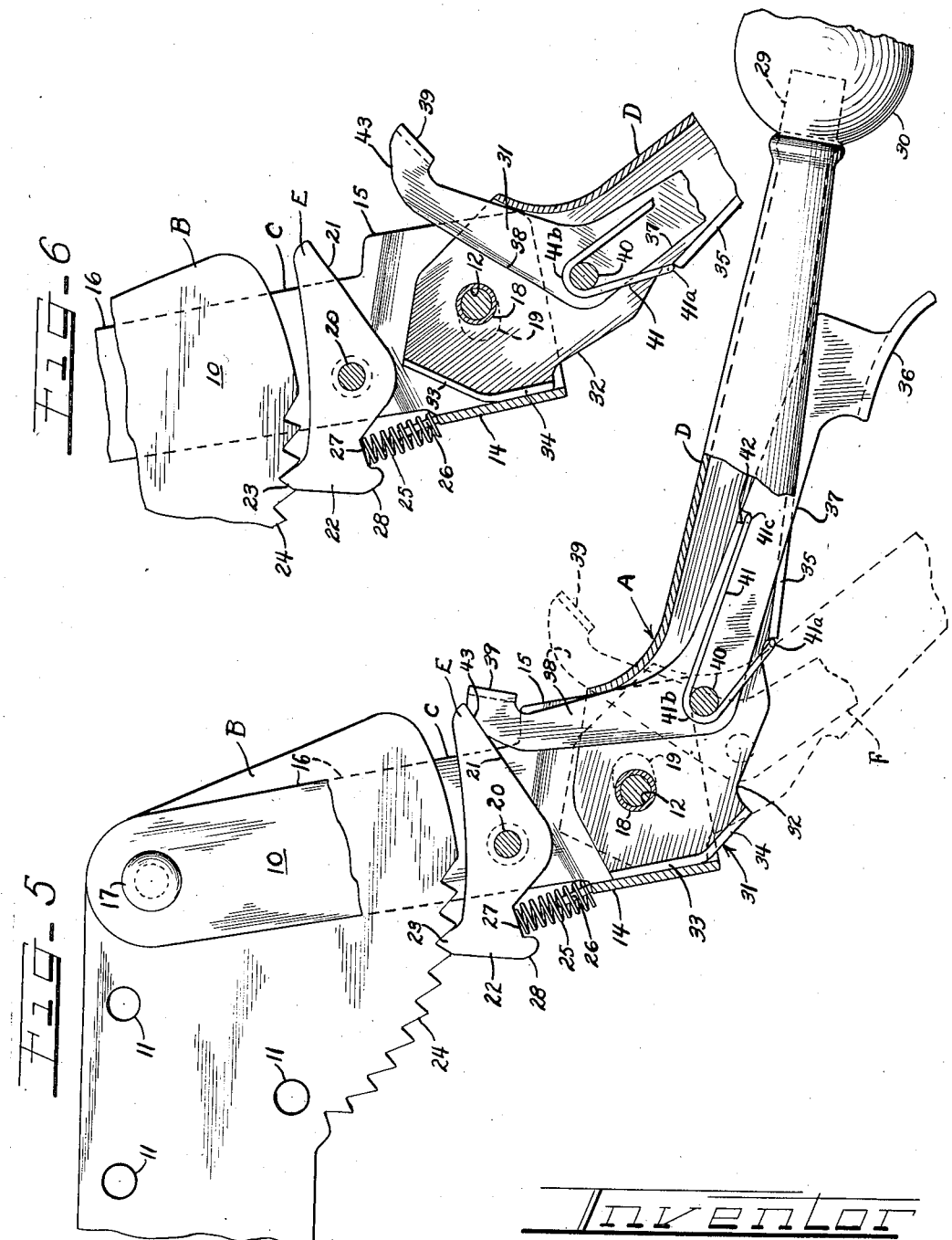
Inventor
Herbert S. Jandus Patented Sept. 22, 1942

2,296,675

UNITED STATES PATENT OFFICE 2,296,675

HAND BRAKE LEVER

Herbert S. Jandus, Detroit, Mich., assignor to Houdaille-Hershey Corporation, Detroit, Mich., a corporation of Michigan Application March 7, 1940, Serial No. 322,741

13 Claims. (Cl. 74—516)

The present invention relates to an automotive brake lever of the dash type. More specifically the invention relates to a jointed brake lever of such construction that less force need be exerted on the lever for actuating the brakes than is required in the usual dash types of brake lever constructions.

Heretofore, in hand brake levers of the dash type, it has been necessary to swing the lever member through a wide arc in order to actuate the brakes and take up the progressive wear on the brake linings. It has been found that a small portion only of the brake lever swing is necessary in actuating the brakes, the greater portion being required in taking up slack of the brake linkage before the brakes can be actuated.

According to this invention an efficient brake lever construction is effected which creates a direct pull on the brake actuating mechanism for taking up slack in the brake linkage and which also creates a high reduction between the operating force and the tension of the brake actuating mechanism for applying the brakes.

It is, therefore, an object of this invention to provide a novel brake lever which has a direct pull effect on the brake linkage until slack therein is taken up and which then effects a high reduction between the pulling movement and brake applying movement to actually apply the brakes.

Another object of this invention is to provide an improved two-part jointed brake lever construction capable of being actuated as unitary lever in either brake setting or brake releasing directions, with one of the lever parts being capable of being swung to an out-of-the-way place at any adjusted position of the other part.

A further object of the present invention is to provide a brake lever construction of hinged lever parts whereby the brakes are actuated by swinging one of the lever parts to an out-of-the-way position away from the operator.

A still further object of the present invention is the provision of a brake lever construction of hinged lever parts, one of which takes up the brake linkage slack when moved in one direction and the other of which actuates the brakes when moved in the opposite direction to an out-of-the-way place.

Another and still further object of this invention is the provision of a two-part hinged brake lever construction having frictional clutching members which cooperate to hold one of the lever parts in adjusted position while the other lever part is swung in a direction for actuating the brakes.

Still another object of this invention is the provision of a two-part hinged brake lever construction of the pawl and ratchet type, the co-operating limits of the pawl and ratchet defining take-up of slack in the brake linkage.

A still further object of the present invention is the provision of a brake lever construction of pivoted lever parts, one of the lever parts pivoting on the other parts with camming action for actuating the brakes.

A still further object of this invention is the provision of a brake lever construction affording a low reduction between pulling effort and brake mechanism tension for quickly actuating the brakes and of a high reduction therebetween for applying greater brake pressures and for locking the mechanism in adjusted position.

The novel features which I believe to be characteristic of my invention are set forth with particularity in the appended claims. My invention itself, however, both as to its organization and manner of construction, together with further objects and advantages thereof, may best be understood by reference to the following description taken in connection with the accompanying drawings, in which:

Figure 1 is a view in side elevation of a brake lever construction embodying the principles of this invention.

Figure 2 is an inner edge view in elevation of the brake lever construction illustrated in Figure 1.

Figure 3 is a fragmentary transverse cross-sectional view of the pivotal connection of the brake lever parts taken substantially in the plane indicated by the line III—III of Figure 1.

Figure 4 is a fragmentary longitudinal view, partially in outer edge elevation and partially in transverse cross-section, taken substantially in the plane indicated by the line IV—IV of Figure 1.

Figure 5 is an enlarged fragmentary view in side elevation, with parts broken away, illustrating, in full lines, the relative position of parts when the slack has been taken up in the brake linkage, and, in dotted lines, the position of parts when the brakes have been fully actuated and a part of the lever has been swung to an out-of-the-way place.

Figure 6 is a view similar to Figure 5, illustrating the relative position of parts when the brake linkage slack has been taken up and the brakes are fully actuated by the cam action between the lever parts.

Referring now to the general embodiment of the present invention as illustrated in Figures 1 to 6 of the drawings, there is illustrated therein a brake lever construction 10 of the "dash type," that is, a lever which is pivoted behind the instrument board of an automotive vehicle having a grip portion projecting below and beyond the instrument board.

Referring to Figure 1, a brake lever A is pivotally connected to, in depending relation from, a mounting plate or bracket B of flat metal stamped to proper size and form and provided with apertures or bolt holes 11 whereby it may be secured in place behind the vehicle instrument board (not shown). The brake lever A consists of two parts, an upper lever part C and a lower lever part D which are pivotally connected together by a suitable pivot pin or rivet 12.

The braking mechanism of the vehicle (not shown) is connected to the brake lever A by means of a clevis 13 which pivotally straddles the brake lever from the pivot pin 12.

The upper lever part C is formed as a stamping from flat metal and is shaped to provide a lower portion of U-shaped cross section having a web 14 and spaced side walls 15 which extend upwardly in inwardly offset relation to provide a pair of spaced legs 16, the legs straddling the support B and hanging in pivotal depending relation therefrom by a pivot 17.

As best shown in Figures 3, 5 and 6, the pivot pin 12 is provided with a spacer sleeve 18 which extends through elongated apertures 19 provided in the side walls 15 of the upper lever part C, the ends of the sleeve terminating flush with the outside surface of the lever member.

A pawl E, of flat metal having substantially the same thickness as the bracket B, is pivotally connected to and between the spaced legs 16 adjacent the U-shaped end of the lever part C by a pivot pin or rivet 20. The pawl E has an elongated body, one end of which is tapered by a slanting edge 21 and the other end terminating in a hammer-head 22, one laterally extending portion of which is provided with a tooth 23. Engagement of the pawl tooth 23 with a tooth on a serrated sector portion 24, formed on an arcuate edge of the bracket B by a radius described from the center of the pivot pin 17, holds the lever member C in adjusted position relative to the bracket B.

Normal engagement between the pawl and sector is maintained by the compression of a coil spring 25. This spring has one end retained in position by a lug 26, which projects from the web 14 of the U-shaped portion of the lever member C. The other end of the spring engages a flat surface 27 provided adjacent the lower laterally extending portion 28 of the pawl hammer-head 22.

The lower brake lever part D is generally tubular in cross-section and terminates at its lower end in a threaded portion 29, to which is secured a plastic ball 30 of a suitable color to match the interior of the vehicle. If desired, the ball 30 may be pressed on the end portion 29.

At its upper pivoted end, the lever part D is provided with a box-like portion 31 having spaced side walls 32 and angularly disposed inturned web portions 33 and 34 at the inner end thereof. As previously mentioned, the lever parts C and D are pivoted together, being connected in a nested or telescopic relation by the pivot pin 12 with the side walls 15 of the U-shaped end of lever C straddling the side walls 32 of the box-like portion 31 of the lever D.

A longitudinal slot 35 (Figures 4, 5 and 6) is provided in the tubular portion of the lever member D through which extends a pawl release member F. The release member F is formed as a stamping from flat metal, and has a flange 36 at its lower end 37 providing a digital operable trigger. The upper end of the release member F has a laterally extending portion 38 terminating in a flange portion 39.

A pivot pin 40, having headed ends 40a and 40b, passes through suitable apertures provided in the side walls 32 of the lever part D to pivotally support the release member F at the angle formed between the end portions 37 and 38 thereof. It is to be noted that the slot 35 in the tubular part D acts as a guide for the release member F to eliminate lateral movement thereof on its pivot pin 40.

Compression of a U-shaped wire spring 41 (Figure 5) normally urges the lower end 37 of the release member beyond the housing part D. The spring 41 has one end 41a bent outwardly to engage against an edge of the side wall 32 immediately adjacent the tubular portion of the lever D, has a U-shaped portion 41b seated around the pivot pin 40, and has its other end 41c bent outwardly to seat within a notch 42 provided in the leading edge of the release member F.

When the parts are in the position shown in Figures 1 and 5, a cam edge 43 at the upper end of the release member engages the underside slanting edge 21 on the pawl E. When digital pressure is exerted on the trigger 36, the release member F swings about the pivot 40 in a counterclockwise direction and the cam edge 43 slides downwardly along the slanting edge 21 to rock the pawl E out of toothed engagement with the sector 24, as shown in dotted lines of Figure 1. As soon as the digital pressure on the release member F is released, the coil spring 25 urges the pawl into toothed engagement with the sector and the U-shaped wire spring 41 urges the release member in a projected operative position.

It should be noted that the outwardly bent edge 39 at the upper end of the release member F, will engage an edge of one of the spaced legs 16 (Figures 4 and 5) to limit the rocking movement of the release member.

When the lever parts C and D are angularly positioned as shown in Figures 1 and 5, that is, when the web 33 engages the web 14, relative movement of the lever part D to the right about the pivot 12 is limited by abutment between the heads 40a and 40b of the pivot and the extended corners 44a and 44b of the U-shaped end of the lever C (Figures 1, 2 and 4). In this position the lever parts C and D are operatively engaged for swinging movement as a unitary lever member A about the pivot 17. When so engaged, the operator grips the ball 30 and swings the lever member A to the right and the pawl ratchets along the sector 24.

The brake linkage is so adjusted that the amplitude of swing along the sector 24 is sufficient to take up the slack in the linkage and the parts are then held in adjusted position as shown in Figure 5.

It is to be noted in Figures 1 and 5, that the relative distance, measured along a line extending through the pivots 17 and 12, between these two pivots and between the pivot 12 and the center of the ball 30 is such that a ratio of approximately two to one of brake take-off load to pulling effort by the operator on the ball 30 exists.

In other words, the operator need apply approximately only one-half as much pull on the ball 30 as there is exerted by tension on the brake mechanism through the clevis 13 when slack is being taken up in the brake linkage. Of course, this reduction of pulling effort to brake take-off load may be varied according to the operative lengths of the two levers provided. By nearly approaching a direct pull without reduction, slack in the brake linkage is taken up quickly.

To apply the brakes, after all slack in the linkage has been taken up, the operator pushes forwardly or downwardly on the ball 30 and the lower lever part D then pivots around the pivot 12. This movement serves to laterally displace the pivot 12 from one end of the slot 19 to its other end by the successive cam applications of the webs 33 and 34 engaging the web 14 of the lever part C (Figure 6) without, however, releasing the pawl E.

This lateral displacement of the pivot 12, to which is secured the brake mechanism (not shown) by the clevis 13, serves to actuate the brakes. Where this distance is relatively short, proper reductions in the linkage mechanism levers are provided so that sufficient movement of the brakes is accomplished to fully actuate them. Otherwise, the distances between the center of pivot 12 and the cam webs 33 and 34 may be increased to laterally displace the pivot sufficiently to operate the brakes without aid of any reduction in the linkage.

By moving the lever part D to actuate the brakes as above described, it is to be noted that the relative operative lengths of the lever arms from the center of pivot 12 to the angular corner between webs 33 and 34 and from the pivot 12 to the center of the ball 30 is such that a ratio of approximately 7 to 1 of brake take-off load to pushing effort by the operator on the ball exists. In other words, the operator need apply approximately only one-seventh as much push on the ball 30 as there is exerted by tension of the brake mechanism through the clevis 13 when the brakes are being actuated. As in the previous case, this reduction of pushing effort to brake take-off load may be varied by increasing or decreasing the operative lever lengths. The approximate ratios of reduction provided in the device illustrated more nearly equalizes the forces necessary to be exerted by an operator in completely actuating the brakes over the highly variable forces required in actuating the usual type of brake lever construction employed at the present time.

To release the brakes, the operator grasps the ball 30 and pulls the lever D to the right thereby releasing the brakes by laterally displacing the pivot 12 to the left (Figure 5). By digitally operating the trigger 36 of the release member F, the pawl is disengaged from the sector and the unitary lever A is then swung to the left to completely release the brakes and allow for slack in the brake mechanism linkage to eliminate any possibility of dragging the brakes.

From the foregoing description, it will be noted that the unitary lever construction A can be oscillated from a position in which the brakes are fully released, as illustrated in Figure 1, to a position in which all of the slack in the brake mechanism linkage is taken up with only a slight reduction between the operating effort and tension of the brake take-off, as shown in Figure 5. After the lever member A is held in adjusted position by the cooperation between the pawl and sector, the lower lever part D is swung in the reverse direction or to the left and the brakes are then actuated by a high reduction between the effort exerted by the operator and the tension load exerted on the brake take-off.

By reversing these steps and disengaging the cooperation between the pawl and sector by rocking the release member complete release of the brakes and slack in the linkage is effected.

It should also be apparent that unitary lever member A is capable of quickly actuating the brakes by a pull exerted on the ball 30 by the operator. It should be noted, however, that the brake actuation may not be permanent as the pawl might be moved past the end of the sector. By releasing the grip on the ball, the unitary lever would then swing to the left under tension exerted by the linkage mechanism to a position in which the pawl and sector engage. In this position all slack in the linkage has been taken up and by pushing the lever D to the left greater pressure on the brakes is exerted, the lever D is moved to an out-of-the-way place, and the lever D is locked in place by the cam engagement between the lever parts.

While I have shown a particular embodiment of my invention, it will, of course, be understood that I do not wish to be limited thereto, since many modifications may be made and I, therefore, contemplate by the appended claims to cover all such modifications as fall within the true spirit and scope of my invention.

I claim as my invention:

1. A lever construction comprising lever parts pivotally connected to each other, one of said parts being pivotally connected to a support, means for operatively connecting said parts for swinging movement as a uint in one direction on said support pivot, and cam means for displacing the other of said lever parts relative to said one part when the former is swung on the pivoted connection therebetween in a direction opposite to the said unitary movement.

2. A jointed brake lever construction including an upper lever and a lower lever, a pivot connecting said lower lever to said upper lever, means for holding said upper lever in adjusted position, and cam means operative when said upper lever is held in adjusted position and said lower lever is moved in angular relation thereto for displacing said pivot.

3. A brake lever construction comprising an upper section and a lower section, a pivot connecting said sections, said lower section and said upper section having cam means for laterally displacing said pivot relative to one of said sections when said lower section is moved in angular relation to said upper section.

4. A brake lever construction having linkage mechanism for actuating brakes comprising two parts, one of said parts being arranged for pivotal connection to a support, clutching members for holding said one part in adjusted position, the other of said parts being pivoted to said one part at their adjacent ends; means for operatively connecting said parts together for movement as a unitary lever for taking up and releasing slack in said linkage mechanism, and cam means operative when said one part is held in adjusted position and when said other part is pivoted on said one part for actuating and releasing the brakes.

5. A brake lever construction having linkage mechanism for actuating brakes comprising an upper lever and a lower lever, a pivot connecting said levers together, said pivot also connecting said linkage mechanism to said levers, said upper lever being arranged for pivotal connection to a support, clutching members for holding said upper lever in adjusted position, means operatively connecting said levers for movement in one direction as a unitary member to take up slack in said linkage mechanism, and cam means operative when said lower lever is pivoted on said upper lever for laterally displacing said pivot to actuate said brakes.

6. A brake lever construction comprising an upper lever member having a body of U-shaped cross section at one end, said U-shaped end having a flat web portion, a lower lever member also having a U-shaped cross section at one end, said last U-shaped end having angular disposed web portions, and a pivot connecting the U-shaped ends of said lever members in telescopic relation, said angularly disposed web portions on said lower lever member successively engaging the flat web portion on said upper lever member for displacing said connecting pivot when said lever members are moved in angular relation with respect to each other.

7. A lever construction for actuating and releasing brakes comprising parts hinged together, means for operatively connecting said parts together for swinging movement as a unit when in one angular position relative to each other, said angular position being such that the brakes are actuated and released by a low reduction of operative effort to brake tension, and cam means operable for displacing one of said parts relative to the other to further actuate or release the brakes by a high reduction of operative effort to brake tension when said one part is moved away from said one angular position.

8. A brake lever construction having linkage mechanism for actuating brakes including a support having an edge formed as a toothed sector, a brake lever comprising first and second parts having a common pivot, said first part being pivoted to said support, said second part terminating in a grip portion, a pawl arranged for pivotal connection to said first part and being shaped to provide a cam surface on an edge thereof, spring means normally biasing said pawl into engagement with said sector to hold said first lever part in adjusted position, a pawl release member having one end shaped to engage the cam surface on said pawl and its other end formed as a trigger, and a pivot connecting said pawl release member to said second lever part and having ends extending from the sides thereof, said pivot ends cooperating with said first lever part to limit relative movement between the lever parts in one direction for forming a unitary lever operable for taking up slack in said linkage mechanism, said second lever part being operable alone for displacing the common lever pivot to fully actuate said brakes.

9. A brake lever construction having linkage mechanism for actuating brakes including a support having an edge formed as a toothed sector, an upper brake lever part having a lower U-shaped end portion and spaced legs projecting upwardly thereof and straddling said support in pivotal relation thereto, a pawl pivotally connected to said legs and normally spring urged into engagement with said sector for holding said upper lever part in adjusted position, a lower lever part having a U-shaped end portion and a grip portion extending therefrom, said U-shaped portions of the lever parts being arranged in telescopic relation, a pivot connecting said U-shaped portions of said lever parts and an end of the linkage mechanism, a pawl release member carried by said last pivot and having one end engaging a portion of the pawl with cam action and its other end shaped as a trigger for rocking said pawl out of engagement with said sector, means on said one end of the release member engaging a spaced leg of said upper lever part when the pawl is rocked out of said sector engagement for limiting rocking movement of the release member in one direction, spring means normally urging said release member in projected operative position, said last pivot coacting with said upper lever part for limiting relative movement between said brake lever parts in one direction, said lever parts when so limited being operable as a unitary member for taking up slack in said linkage mechanism, and said lower lever part being movable in a direction opposite to the slack take-up movement for laterally displacing said last pivot by cam action between the lever parts to set said brakes.

10. A brake lever construction having linkage mechanism for actuating brakes comprising two parts having portions arranged for engagement when said parts are in predetermined angular arrangement, one part being pivoted to a support to hang therefrom, the other part being pivoted at one of its ends to fit said one part and to hang therefrom, a clevis connecting said linkage mechanism and said parts by the pivotal connection between said parts, said one part and support having cooperating clutching means normally spring urged into engagement to hold said one part in adjusted position relative to the support, said other part providing a grip portion at its other end, means limiting relative movement between said parts when pulling force is applied to the grip portion to swing the engaged parts in one direction, means operative adjacent the grip portion for releasing the clutching means only when the parts are in or near said angularly arranged engagement, and additional means operative with cam action when pushing force is applied to the grip portion to swing said other part in the opposite direction for displacing the pivotal connection between said parts.

11. A brake lever construction having linkage mechanism for actuating brakes comprising two parts, one of said parts being pivoted to a support to swing, the other of said parts being pivotally connected to said one part in such a manner as to be swung thereon between angular limits, said linkage mechanism being connected to the pivotal connection between said lever parts, and means for operatively connecting said lever parts into a unitary lever for swinging movement as a whole when pulling pressure is applied to said other part for actuating said brakes to an unlocked position, said lever parts having cam means therebetween for locking the parts in a brake actuated position when pushing pressure is applied to said other part.

12. A brake lever construction for actuating brakes comprising lever members, a pivot connecting said lever members together for relative swinging movements, means connecting said pivot to said brakes, other means holding said lever members together against relative movement for movement as a unitary lever for partially actuating said brakes, and additional means for shifting said pivot relative to one of said lever members for fully actuating said brakes when the one lever member is held in adjusted position and the other of said lever members is swung relative to said one lever member.

13. A brake lever construction comprising lever members, one of said lever members being pivoted to a support to swing, cooperating clutching means for holding said one lever member in an adjusted position, a pivot connecting said lever members together for relative swinging movements, and means for shifting said pivot relative to one of the lever members when said one lever member is held in an adjusted position and the other of said lever members is swung relative to said one lever member.

HERBERT S. JANDUS.